(No Model.) 8 Sheets—Sheet 1.
C. UMBACH.
MAGAZINE CAMERA.

No. 563,697. Patented July 7, 1896.

Fig. 1.

WITNESSES: INVENTOR
Frank S. Ober Christian Umbach
John Kraeger BY
 W. H. Rosenbaum
 ATTORNEY (No Model.) 8 Sheets—Sheet 3.

C. UMBACH.
MAGAZINE CAMERA.

No. 563,697. Patented July 7, 1896.

Fig. 3.

WITNESSES: INVENTOR
Christian Umbach
BY
Attorney

THE NORRIS PETERS CO., PHOTO-LITHO., WASHINGTON, D. C.

(No Model.) 8 Sheets—Sheet 4.

C. UMBACH.
MAGAZINE CAMERA.

No. 563,697. Patented July 7, 1896.

WITNESSES:
Frank S. Ober
John Kraeger

INVENTOR
Christian Umbach
BY
Wm A. Rosenbaum
ATTORNEY

THE NORRIS PETERS CO., PHOTO-LITHO., WASHINGTON, D. C.

(No Model.) 8 Sheets—Sheet 5.

C. UMBACH.
MAGAZINE CAMERA.

No. 563,697. Patented July 7, 1896.

WITNESSES:
INVENTOR
BY
ATTORNEY (No Model.) 8 Sheets—Sheet 6.

C. UMBACH.
MAGAZINE CAMERA.

No. 563,697. Patented July 7, 1896.

WITNESSES:
Frank S. Ober
John Kralger

INVENTOR
Christian Umbach
BY
Wm. W. Rosenbaum
ATTORNEY

THE NORRIS PETERS CO., PHOTO-LITHO., WASHINGTON, D. C.

UNITED STATES PATENT OFFICE.

CHRISTIAN UMBACH, OF JERSEY CITY, NEW JERSEY, ASSIGNOR TO HENRY BERG, OF ORANGE, NEW JERSEY.

MAGAZINE-CAMERA.

SPECIFICATION forming part of Letters Patent No. 563,697, dated July 7, 1896.

Application filed June 5, 1895. Serial No. 551,726. (No model.)

*To all whom it may concern:*

Be it known that I, CHRISTIAN UMBACH, a citizen of the United States, residing at Jersey City, in the county of Hudson and State of New Jersey, have invented certain new and useful Improvements in Cameras, of which the following is a full, clear, and exact description.

This invention relates to magazine-cameras, and has special reference to a camera in which the plates contained in the magazine are transferred one by one from the bottom thereof to the position for exposure and then returned to the magazine.

The object of the invention is to make this transfer from and to the magazine with simple and easily-operated mechanism, which occupies the smallest amount of space commensurate with the work done.

The invention consists of the devices and combinations thereof hereinafter more fully described, and particularly pointed out in the claims.

In the accompanying drawings.

A represents the inclosing casing of the camera. It is oblong in shape and provided at the rear with a magazine $a$ for the sensitized plates $a'$. This magazine is rectangular in shape, and is formed by a vertical partition $a^2$, which is of such size and location as to leave an open space above and below it. The camera is supposed to be always full of plates, more or fewer of which may have been exposed. The function of the mechanism is to remove the bottom plate from the magazine to a position outside thereof, where it is exposed to take a view, and then returned to the magazine and deposited upon the top of the stack of plates therein, the stack meanwhile having lowered the depth of one plate to admit it. This function is performed during one rotation of a main shaft, during which time also the view-finding mechanism is shifted and the shutter is operated.

Inside of the main casing A is a main frame B, consisting of suitably-supported side pieces arranged parallel to and a short distance from the sides of the camera. The plates rest in the magazine upon two ledges $a^3$, located at each side thereof, and these are so arranged that the bottom plate only is below the lower edge $a^4$ of the front partition of the camera. Beneath the plates and located in two longitudinal grooves $a^5$ in the bottom of the camera are two reciprocating arms $b$, connected together by braces $b'$, and hinged at their forward ends to a cross-rod $b^2$. The cross-rod at its extremities is connected with racks $b^3$, running in grooves $b^4$ on each side of the machine. The rear ends of arms $b$ have short turned-up hooks $b^5$, adapted to engage with rear edge of the lower plate in the magazine. Under the hooks the arms are shaped with an incline $b^6$, adapted to engage with the inclined end $b^7$ of the slot or track in which the rack runs, for the purpose of lifting the rack and throwing the hooks behind the edge of the plate.

Figure 2:
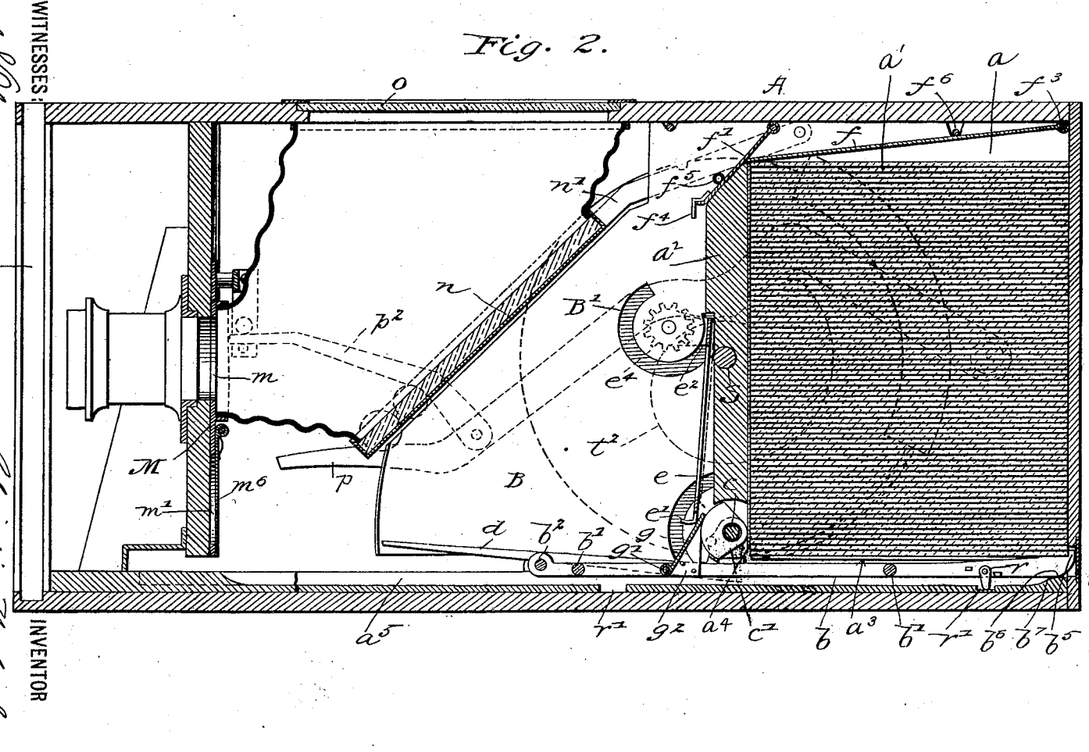
Figs. 2 and 3 are sectional views of the camera, taken on line $x\, x$ of Fig. 4, and showing the parts in two different positions.

At the lower edge of the partition $a^2$ is mounted a horizontal shaft $c$, upon which are loosely pivoted two lifting-arms $d$, one near each end thereof. The arms are provided with offset-brackets $d'$, in which the pivot is located, and these brackets are each provided with a pin $d^2$, for a purpose which will hereinafter appear. These arms normally extend forward from the shaft and occupy a substantially horizontal position at a level below the lower edge of the partition $a^2$. Near their inner ends the arms are provided with notches $d^3$. Upon each end of the shaft $c$ is also loosely hung a sector or quadrant $c'$, the curved periphery of which is toward the front and with a radius extending to the notch $d^3$. The lower corner of this sector rests upon a table or anvil $c^2$, but is adapted to be lifted therefrom by pressure from behind. The opening under the lower edge of the partition $a^2$ is closed by a flap $g$. The flap is hinged upon a transverse shaft $g'$, extending between the arms $b$ and carried thereby. It normally rests against two triangular brackets $g^2$, fixed to the arms $b$. In this position the flap is held by a spring $g^3$, stretched between shaft $b'$ and a projection $g^4$ on the flap. The flap in its normal position is shown in Fig. 2 with its upper edge behind the lower edge of the returning-frame $e$, hereinafter referred to.

In constant engagement with each of the racks $b^3$ is a pinion $b^8$, located in the space between the main frame B and the side of the camera and with its shaft fixed in the frame.

Figures 7, 8, 9, 10:
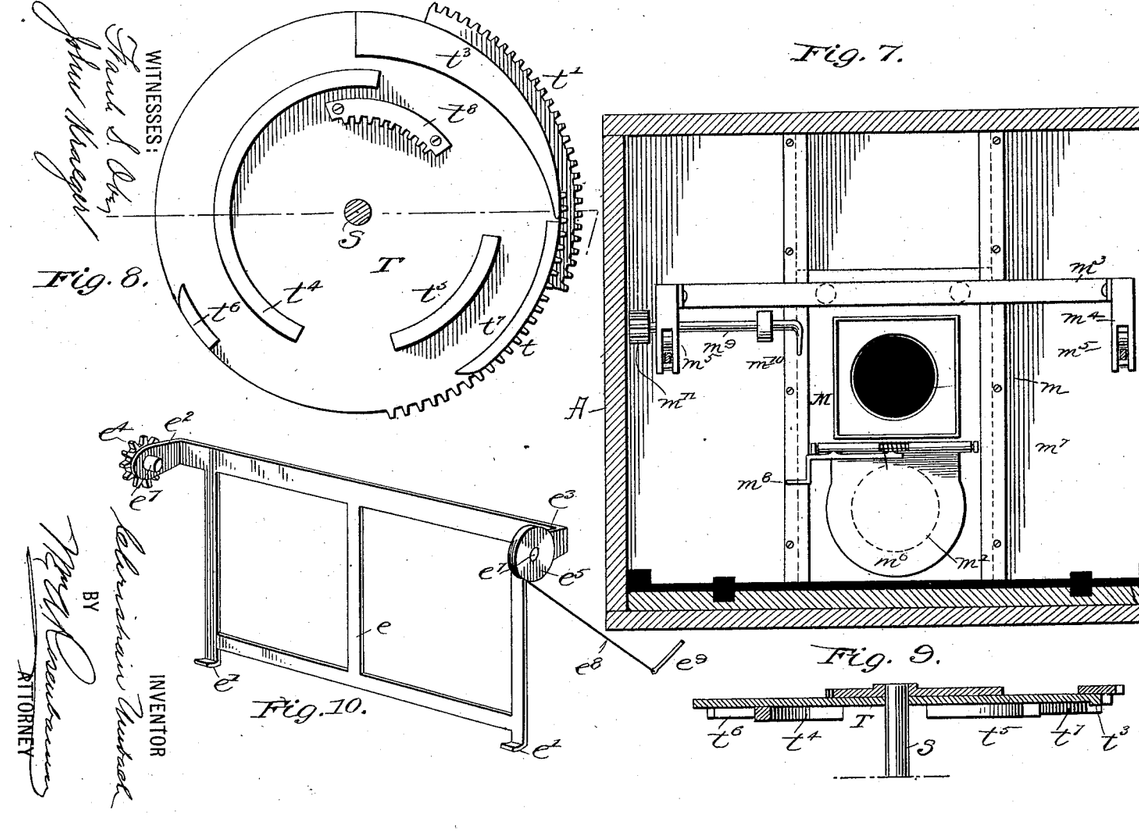
Fig. 7 is an elevation of the end of the camera, looking from the inside toward the lens-tube.
Figs. 8 and 9 are respectively a side elevation and section of one of the main operating-wheels.
Fig. 10 is a perspective view of the shifting-frame.

Fig. 10 illustrates what I call the "returning-frame" $e$. It is a rectangular frame having two hooks $e'$ at the lower edge and provided with two right-angle projections $e^2$ and $e^3$, which respectively carry a pinion $e^4$ and a pulley $e^5$. This frame normally occupies a shallow recess in the lower front side of partition $a^2$, with its hooks projecting forward at a point near the lower edge of the partition. The frame is hinged upon its studs $e^7$, which pass into the sides B of the main frame. The ears $e^2$ and $e^3$, with the wheels which they carry, extend through curved openings B' in the frame and occupy positions on the outside thereof between the frame and the inclosing casing. A cord $e^8$ is attached to the pulley at one end and to a spring $e^9$ at the other. The spring is attached to the main frame B, as shown in dotted lines in Fig. 1.

Above the magazine are arranged two flaps $f$ and $f'$, respectively. One of them covers the entire top of the magazine, while the other closes the space between the upper edge of the partition $a^2$ and the top of the camera, one flap thereby supplementing the other as a light-excluding device. These flaps are hinged, respectively, at the points $f^2$ and $f^3$, and the forward edge of $f$ bears against the rear side of $f'$. The upper edge of the partition $a^2$ is beveled and the flap $f'$ rests against the beveled surface. It is provided with two hooks $f^4$, and it is locked in its closed position by spring-bolts $f^5$, which pass through the main frame B and overlap the edges of the flap. The flap $f$ is provided with a pin $f^6$, projecting through a slot in the frame and into the space between the frame and the side of the camera. In this space between the frame and the side of the camera, and pivoted to the frame, is a bell-crank lever $h$, one arm of which is adapted to strike the pin $f^6$ to lift the flap. In the lower portion of this space is fixed the straight pivoted lever $i$, having a dog at one end adapted to engage with rack $b^3$, and to be held in such position by a spring $i'$. The operation of these levers will be referred to hereinafter.

The front wall C of the camera is provided at or near its center with a circular opening, to which is fitted the lens-tube D. Against the back side of this wall is arranged a vertical slide M, having two openings $m$ and $m'$, arranged one above the other, either of which is adapted to be brought into line with the lens-tube. The slide runs in suitable guides $m^2$ and carries a cross-piece $m^3$, to the ends of which are fixed brackets $m^4$, each having a pair of antifriction-rollers $m^5$, arranged one above the other with a space between them.

The opening $m$ in the upper part of the slide is for finding the view. The lower opening $m'$ is normally closed by the shutter $m^6$. This is hung on a shaft $m^7$ and is held closed by a spring, as shown. The shaft carries a crank $m^8$, and another shaft $m^9$, carrying a crank $m^{10}$, is adapted to engage with crank $m^8$ to open the shutter. Shaft $m^9$ carries a pinion $m^{11}$ and is operated as hereinafter described.

For a view-finder I use a mirror $n$, supported upon a hinged frame $n'$ and normally standing at an angle of forty-five degrees to the plane of the opening $m$. A ground-glass plate $o$ is fixed in the top of the camera, and receives the reflection of the view from the mirror. The edges of the opening $m$, the mirror, and the ground-glass plate $o$ are surrounded by a flexible diaphragm impervious to light and inclosing a space or chamber between these three parts. This flexible diaphragm effectually excludes all the light from other parts of the camera when the opening $m$ is in line with the lens-tube. The mirror and the slide M are adapted to be simultaneously lifted by means of two arms $p$, one arranged on each side and pivoted in the rear portion of the camera to the main frame B. These arms bear against antifriction-rollers on the mirror-frame $n'$. Near the extremity of each arm $p$ is pivoted a second arm $p^2$. This extends forward and passes between the rollers $m^5$ in the brackets $m^4$, attached to the slide M. These arms also rest upon rollers, as shown, attached to frame $n'$. The two rollers are located between the two arms $p$ and $p^2$, and the arrangement is such that the upward movement of the arm $p^2$ is at a slower rate than that of the arm $p$, in consequence of which the short movement necessary to shift the slide may be made simultaneously with the longer movement of the mirror, and both through the medium of arms $p$.

Figure 1:
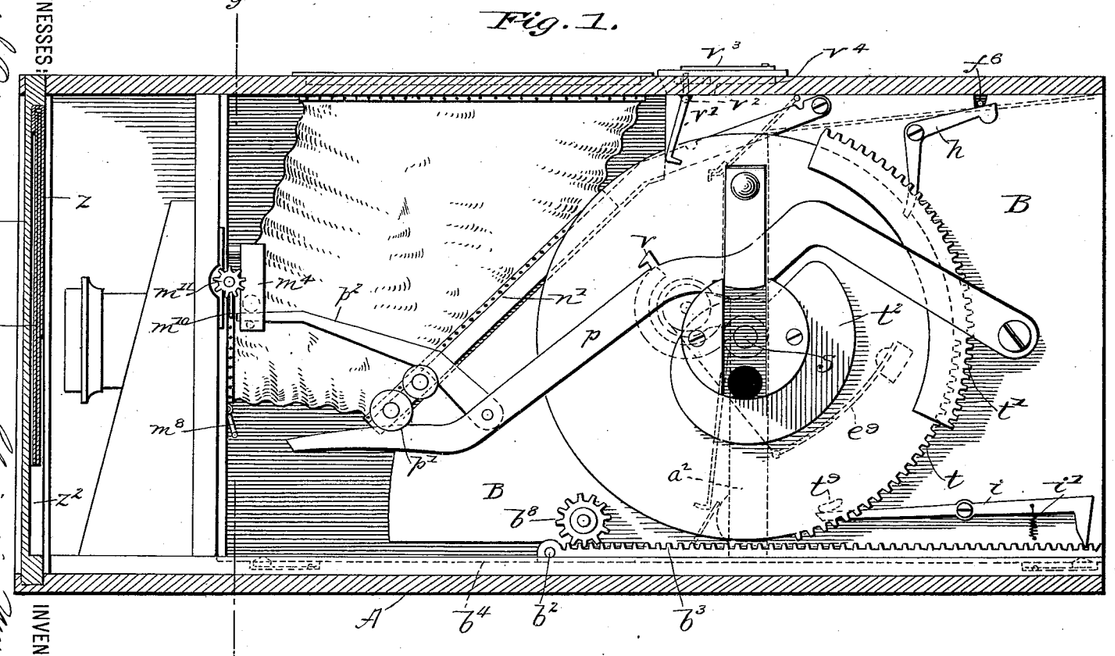
Figure 1 is a side elevation of my improved camera with one side of the inclosing case and the shutter-operating mechanism removed.
Figure 19:
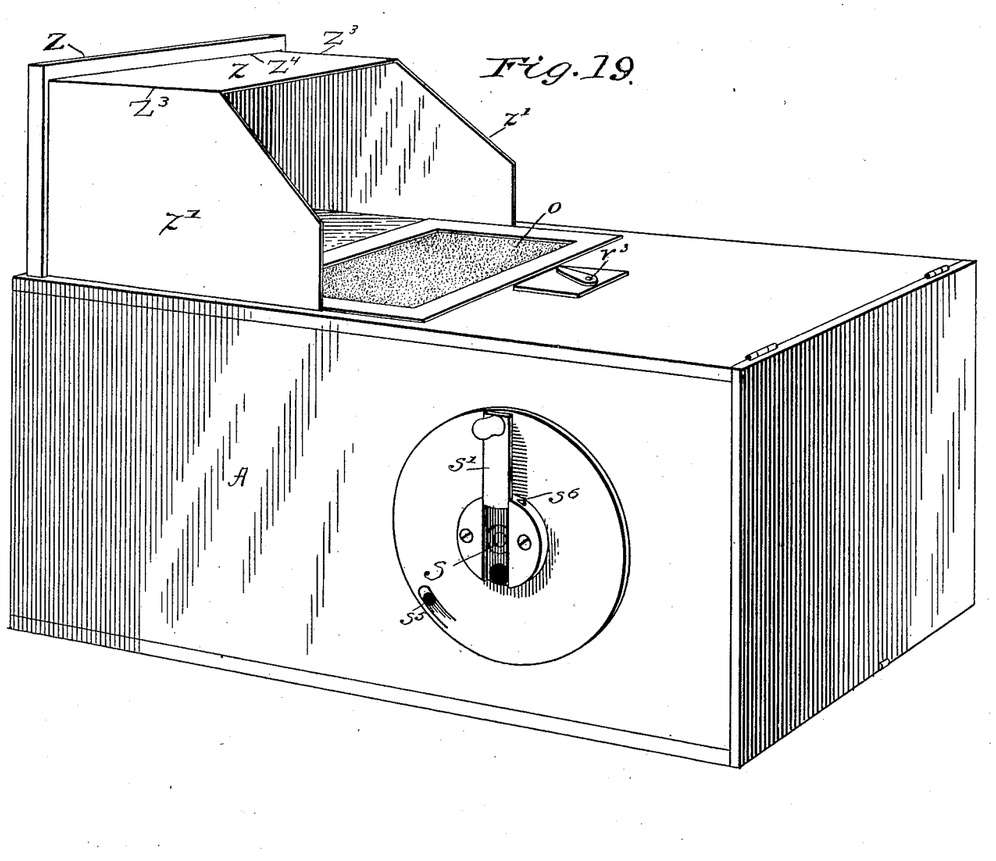
Fig. 19 is a perspective view of the camera, showing the shade for the ground-glass plate.

To make the image on the ground glass more distinct, I have provided a shade. (Shown in Fig. 19.) This consists of two side flaps $z'$, hinged along the lines $z^3$ to a middle or cover flap $z$, which in turn is hinged along the line $z^4$ to the upper edge of a slide Z. The slide is fitted to grooves $z^2$ in the sides of the camera, at the extreme forward end thereof, and normally closes the front end of the box and covers the lens-tube, the flaps being folded down, as shown in Fig. 1, but when a picture is to be taken the slide is lifted to the position shown and the flaps unfolded to rest the edges of the sides $z'$ upon the top of the camera and flanking each side of the ground-glass plate. This throws a shadow upon the plate and brings out the view or image.

Figure 13:
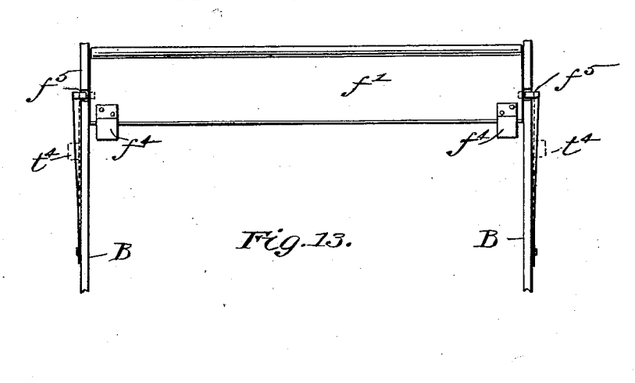
Figs. 13 and 14 are details.
Figure 14:
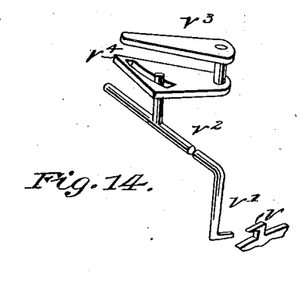
Figure 15:
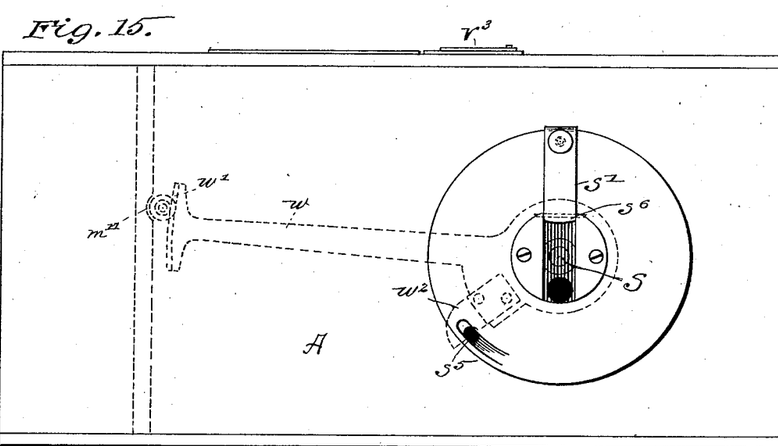
Fig. 15 is a side elevation of the outside of the camera, showing in dotted lines the shutter-operating mechanism.
Figures 16, 17:
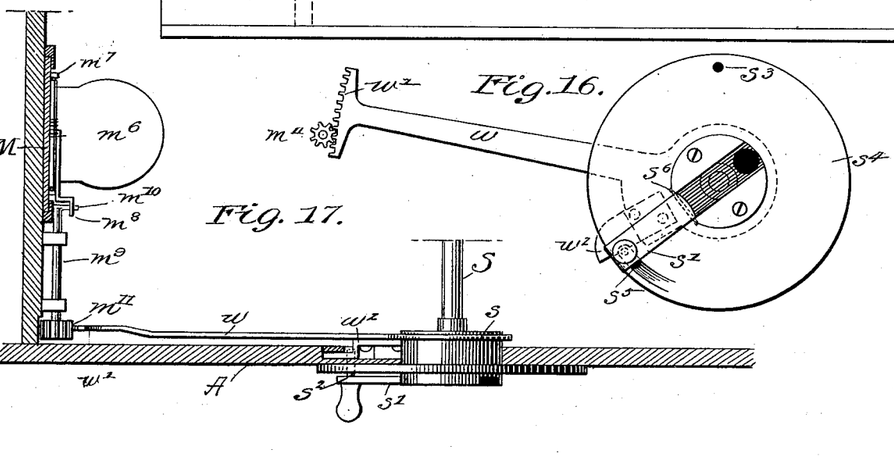
Fig. 16 shows the shutter-operating mechanism in a different position.
Fig. 17 is a horizontal section through the side and front of the camera, showing the shutter mechanism.
Figure 18:
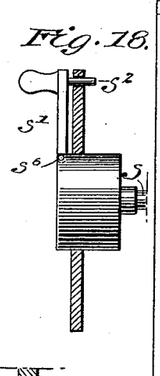
Fig. 18 is a central vertical section of a portion of the frame surrounding the main shaft, showing the operating-crank in its normal position.

The mechanism of this camera is operated from a single main shaft, one revolution of which accomplishes the complete cycle of movements which the camera is capable of. This main shaft is lettered S. It extends transversely through the camera, and has its bearing in the partition $a^2$. The end which projects through the camera-casing is provided with a drum $s$, the drum having its bearing in the casing. To the outside of the drum is attached a crank-handle $s'$, by which the shaft may be rotated, and the crank itself is hinged at the point $s^6$ to enable it to swing outward. The normal position of this crank is shown in Fig. 15, at which point a pin $s^2$, carried by the crank, passes into a hole $s^3$ in a metallic frame-plate $s^4$, and locks the shaft. When the shaft is to be rotated, the crank is first swung outward to remove the pin from the hole. At another location in this plate $s^4$ a slot $s^5$ is made. This also is adapted to receive the pin $s^2$. It is understood, of course, that plate $s^4$ is stationary, and that the drum rotates in it. The shaft carries two main operating-wheels T T, one on each side of the camera and located in the spaces between the main frame B and the side walls of the camera. These wheels are nearly alike in their construction, both having two gear-segments $t$ and $t'$, respectively, and both having a cam $t^2$ on their outer sides and cams $t^3$ and flanges $t^4$, $t^5$, $t^6$, and $t^7$ on their inner sides. One of the wheels on its inner side has a short internal gear-segment $t^8$. The gear-segments $t$ are normally out of engagement with the racks $b^3$, and in this position a short cam or projection $t^9$ on the wheels stands immediately above the end of levers $i$. The first motion of the wheels to the right will therefore lift the dog of lever $i$ out of engagement with the rack and permit it to move forward, when gear-segment $t$ immediately thereafter moves into engagement with the rack. The peripheries of cam $t^2$ engage with the arms $p$, and during one rotation of the wheels these arms are caused to move upward a full stroke and return to their normal position. (Shown in Fig. 1.) The eccentric surfaces of cams $t^3$ respectively engage with the pins $d^2$ on the arms $d$ and cause said arms to gradually lift through an arc of about ninety degrees. The flanges $t^4$ and $t^5$ are adapted to press against the bolts $f^5$, as shown in Fig. 13, and thereby lock the flap $f'$. The spaces between these flanges indicate the periods when the flap is unlocked. The flanges $t^6$ and $t^7$ engage with the bell-crank lever $h$, causing it to lift flap $f$. The gear-segment $t^8$ is located in a position to engage with pinion $e^4$ on the returning-frame $e$. The relative circumferential positions which the several cams and flanges occupy will appear in the description of the operation.

The shutter-operating mechanism consists of an arm $w$, mounted loosely upon the drum $s$, in order to be concentric therewith, and provided at its forward end with a segment of gear $w'$ in engagement with pinion $m^{11}$. The arm stands parallel with and close to the camera-casing and is provided with a projection $w^2$, extending across the slot $s^5$ in plate $s^4$ and immediately back of the same. The normal position of the cams $w'$ with respect to the pinion is shown in Fig. 15.

Figure 3:
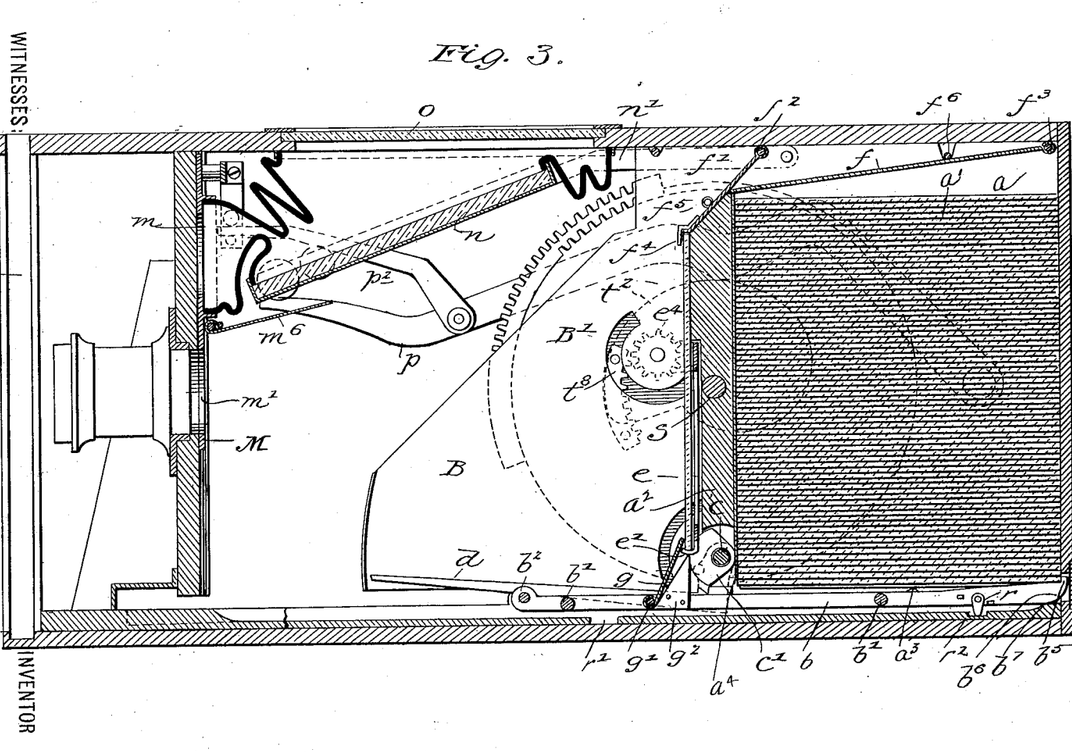
Figure 4:
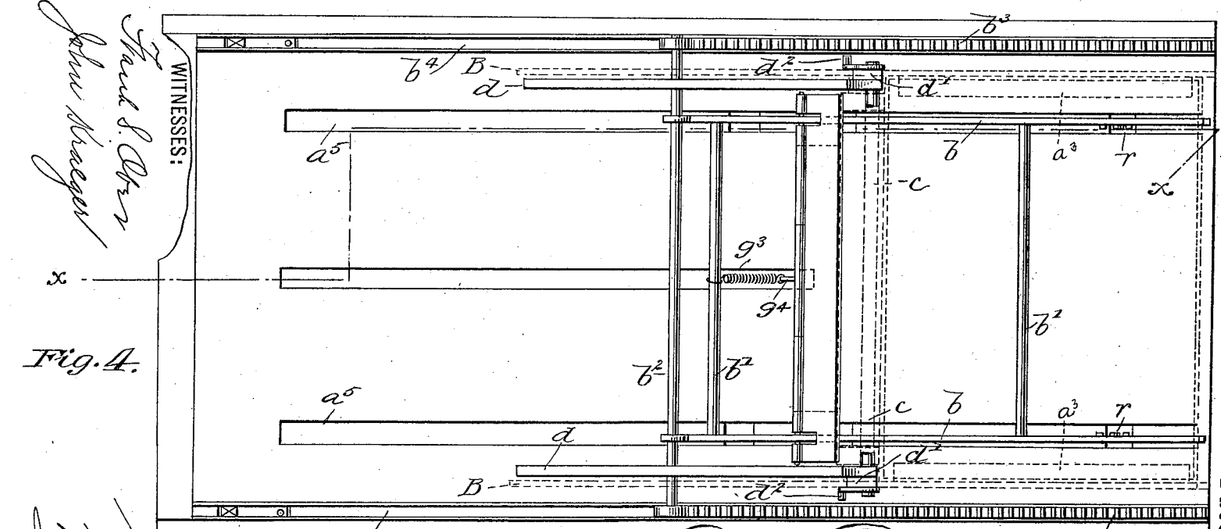
Fig. 4 is a plan of the mechanism at or near the floor of the camera, the upper parts being removed.
Figure 5:
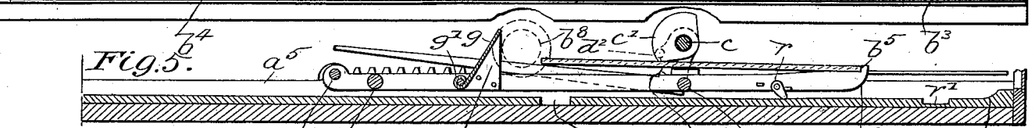
Figs. 5 and 6 are sectional views taken on line $x\, x$ of Fig. 4 and showing the mechanism in two different positions.
Figure 11:
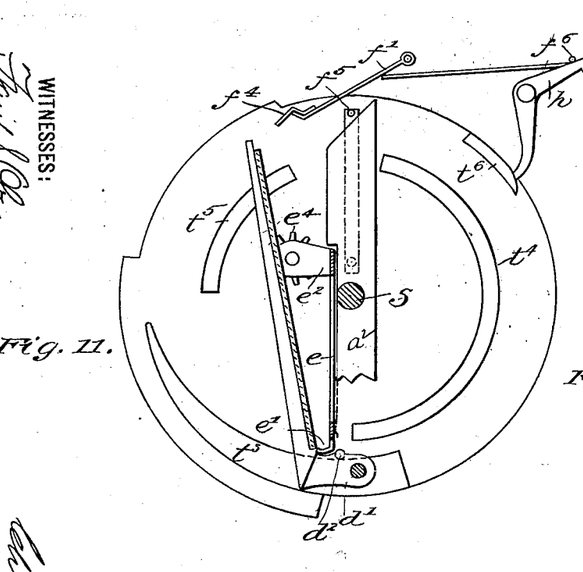
Figs. 11 and 12 are views of the plate-shifting mechanism, showing two different positions of the plate.
Figure 12:
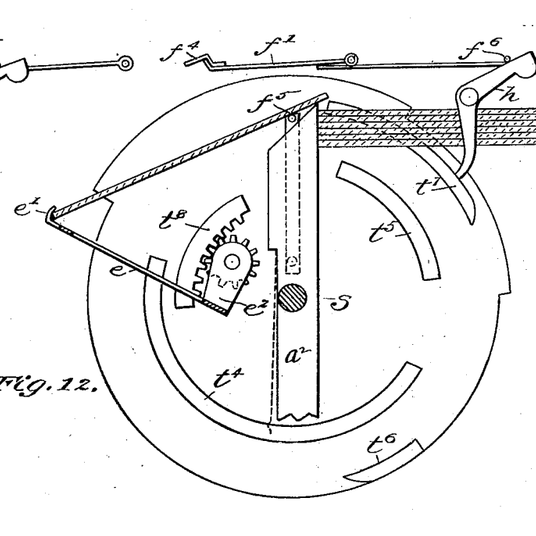

The operation is as follows: The magazine is supposed to be filled with plates or films, the stack resting upon two shelves $a^3$ at the bottom, as before described. Slide M being down, and the mirror in its lowest position, the view is found upon the ground-glass plate in the top of the camera. The crank-handle is in the position shown in Fig. 15, and the parts are all located as shown in Figs. 1 and 2. The crank is removed from the hole $s^3$, and the shaft is rotated to the right. The first movement unlocks the racks $b^3$ by lifting levers $i$ out of engagement therewith. Immediately thereafter segments $t$ engage with the racks $b^3$ and slide the same forward in their grooves. The racks carry with them arms $b$, which are in engagement with the lower plate or film in the magazine, and the said plate is therefore carried forward through the opening below partition $a^2$, lifting as it passes through the quadrants $c'$, they dragging meanwhile upon the surface of the anvils, as shown in Fig. 5. This forward motion continues until the plate is deposited upon the lifting-arms $d$, just ahead of notches $d^3$ therein. Simultaneously with this movement of the plate, cam $t^2$ gradually lifts the mirror and slide M upward to the position shown in Fig. 3. As soon as the plate is deposited upon the arms $d$ segments $t$ run out of engagement with the racks, and segments $t'$ then engage with the pinions $b^8$. Before this the pinions have been running as idlers, but now their direction of rotation is reversed, and the racks are returned to their original position, segments $t'$ being just long enough to do this. Simultaneously with this movement, or as soon as the plate is deposited upon arms $d$, the cams $t^3$ run under pins $d^2$ on the arms $d$, and gradually swing said arms upward, thus carrying the plate to a substantially vertical position. It is during this upward movement of the plate that the important function of the sectors or quadrants $c'$ is performed. The lower edge of the plate rides over the curved peripheries of the quadrants, and is thereby prevented from jumping out of the notches $d^3$, which it would be likely to do in case of any vibration or jar of the camera. During this upward movement of the plate, flanges $t^4$ are running in contact with the bolts $f^5$, but just before the plate reaches its vertical position the flanges run off of the bolts, as shown in Fig. 11, and allow them to spring outward and release the flap $f'$. Immediately thereafter flange $t^6$ strikes the toe of bell-crank lever $h$ and lifts flap $f$, which in turn lifts flap $f'$, allowing the plate to pass under or behind the hooks $f^4$ on flap $f'$ and to rest against the face of the partition $a^2$. As soon as the plate has reached this position flange $t^6$ releases the flaps and they close of their own weight, the hooks $f^4$ retaining the upper edge of the plate. The flaps immediately become locked again by the flanges $t^5$. The plate in going to its position against the partition $a^2$ is lifted onto the hooks $e'$ at the lower edge of the returning-frame $e$, after which the lifting-arms fall by their own weight to their original position, (shown in Fig. 3,) they being released by cams $b^6$, running beyond pins $d^2$, and at the same time the carriage, which has been meanwhile moving back, brings the flap $g$ back against the lower edge of the plate, as shown in Fig. 3, and thus excludes light entering through the lens-tube from the opening at the lower end of the partition $a^2$. The passage of light around the ends of this opening is also cut off by the blocks $g^2$ and the quadrants $c'$. The plate is now in position and everything is ready for the exposure. At this time the crank has reached the slot $s^5$ in the plate $s^4$. The pin $s^2$ is then forced into the slot and the crank rotated as far as the slot will permit it. In making this movement the pin strikes projection $w^2$ and moves the arm $w$ sufficiently to throw the shutter wide open, as shown in Fig. 3. The exposure is continued as long as desired, and then the crank is lifted to remove the pin from the slide, and immediately the shutter closes by its own weight or spring. It will be observed that when the slide M is lifted in the first part of the movement the small crank on the shutter is placed across the crank on shaft $m^9$, so that the rotation of said shaft will lift the shutter. The exposure having been made, the revolution of the crank is continued. Flanges $t^5$ release the bolts $f^5$ just before the gear-segment $t^8$ engages with the pinion $e^4$. At about the same time also flange $t^7$ engages with the bell-crank $h$, and the flaps $f$ and $f'$ are again opened. The rotation of the pinion $e^4$ swings the lower edge of the frame $e$ with the plate outward and upward, and finally slides the plate backward over the top of partition $a^2$ and sends it into the magazine on top of the stack of plates therein, the stack having moved down the necessary distance to admit one plate as soon as the plate was removed from the bottom. Then segment $t^8$ runs out of engagement with pinion $p^4$, and the spring $e^9$ and cord $e^8$ quickly return frame $e$ to its original position. At the same time flange $t^7$ releases the flaps $f$ and $f'$, and they close the opening above the magazine, and are immediately locked by flanges $t^4$. At this time the crank-handle has made one revolution, and the pin which it carries is forced into the hole $s^3$, indicating the fact.

Figure 6:
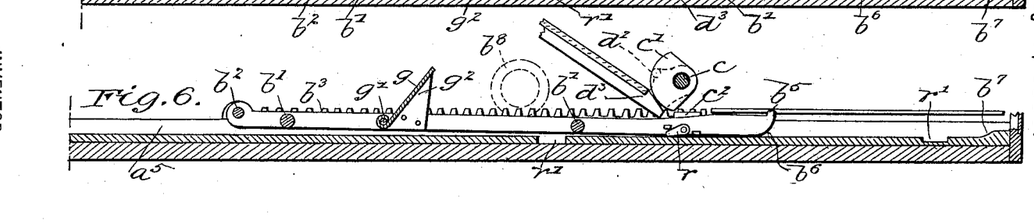

It will be observed that when the plate-carriage $b\ b$ reaches the end of its backward movement the ends of arms $b$ run up the inclines $b^7$ and thereby throw the hooks behind the next plate, ready for the next operation. The function of the levers $i$ is to prevent any movement of the racks, except by the regular motion imparted to the crank-handle. In Figs. 5 and 6 I have illustrated means, consisting of the pawl $r$ and the notches $r'\ r'$, for holding in an elevated position the rear ends of arms $b$ while they are moving forward with the plate, and for dropping said arms when they move backward. No invention is claimed in these devices.

It may be desired to make a number of exposures without materially changing the view, in which case it is unnecessary to each time operate the mirror and the slide M. I have therefore provided hooks $v$ on arms $p$, which, when the mirror is raised, are adapted to be engaged by hooks $v'$ on a shaft $v^2$ in the upper part of the camera. This shaft is rocked into and out of engagement with hooks $v$ by means of the handle $v^3$ on the outside of the camera and plate $v^4$, having a cam-slot into which a pin on the shaft $v^2$ projects.

Having thus described my invention, I claim—

1. In a camera the combination of a stationary plate-magazine mechanism for shifting a plate therefrom to the exposure position, other mechanism for returning the plate to the same magazine, and a main shaft having one complete forward rotation in which said mechanisms are successively operated during one complete forward rotation thereof.

2. In a camera, the combination of a stationary plate-magazine, mechanism for shifting a plate therefrom to the position for exposure, independent mechanism for operating the shutter, mechanism for returning the plate to the same magazine, and a main shaft from which said mechanisms are successively operated, substantially as described.

3. In a camera, the combination of a magazine, a carriage adapted to remove a plate therefrom and deliver it to a lifting-frame, a lifting-frame adapted to deliver the plate to a returning-frame, and a returning-frame adapted to return the plate to the magazine, substantially as described.

4. In a camera, the combination of a magazine, a carriage adapted to remove a plate therefrom, and deliver it to a lifting-frame, a lifting-frame adapted to deliver the plate to a returning-frame, and a returning-frame adapted to return the plate to the magazine, the whole being operated by and in combination with a single shaft, substantially as described.

5. In a camera, the combination of a plate-magazine, a carriage adapted to convey a plate therefrom, and a light-excluding flap attached to the carriage and normally closing the opening through which the plate is carried, as set forth.

6. In a camera, the combination of a magazine provided with two openings through which the plates of the magazine are adapted to pass in leaving and returning to the magazine, light-excluding devices protecting each opening, and a shaft controlling the movements of the plates from and to the magazine and also operating the light-excluding devices, substantially as described.

7. In a camera, the combination of a magazine in which the plates are horizontally disposed, one above the other, means for moving a plate from the magazine, a lifting-frame adapted to receive the plate and lift it to a vertical position by swinging on a center through an arc of about ninety degrees and a quadrantal block pivoted concentric with the frame, and adapted to support the lower edge of the plate while it is moving upward, substantially as described.

8. In a camera, the combination of a magazine provided with two openings through which the plates of the magazine are adapted to pass in leaving and returning to the magazine, light-excluding devices protecting each opening, and a shaft controlling the movements of the plates from and to the magazine and also operating the light-excluding devices, and means for locking said light-excluding devices.

9. In a camera, the combination of a plate-magazine, a carriage adapted to remove the plates therefrom, and a lock for said carriage when inactive.

10. In a camera, the combination of the pivoted lifting-arms $d$, $d$, provided with pin $d^2$ and an operating-cam adapted to engage with the pin to lift the arms, for the purpose set forth.

11. In a camera, the combination of a magazine and an exposing-chamber communicating with each other through an opening, and two light-excluding flaps closing said opening, one supplementing the other, said flaps being connected so that the movement of one also moves the other.

12. In a camera, the combination of a magazine provided with two openings through which the plates of the magazine are adapted to pass in leaving and returning to the magazine, light-excluding devices protecting each opening, and a shaft controlling the movements of the plates from and to the magazine and also operating the light-excluding devices.

13. In a camera, the combination of a shutter, a lever adapted to operate the same, a rotary shaft adapted to shift a sensitized plate into and out of position for exposure and a pin carried by the shaft and adapted to engage with the lever during the rotation of the shaft, substantially as described.

14. In a camera, the combination of a shutter, a lever adapted to operate the same, a rotary shaft carrying a hinged crank, a pin on said crank, and a fixed slot into which said pin is adapted to project to engage with said lever and move it.

In testimony whereof I subscribe my signature in presence of two witnesses.

CHRISTIAN UMBACH.

Witnesses:
FRANK S. OBER,
JOHN KRALGER.